UNITED STATES PATENT OFFICE.

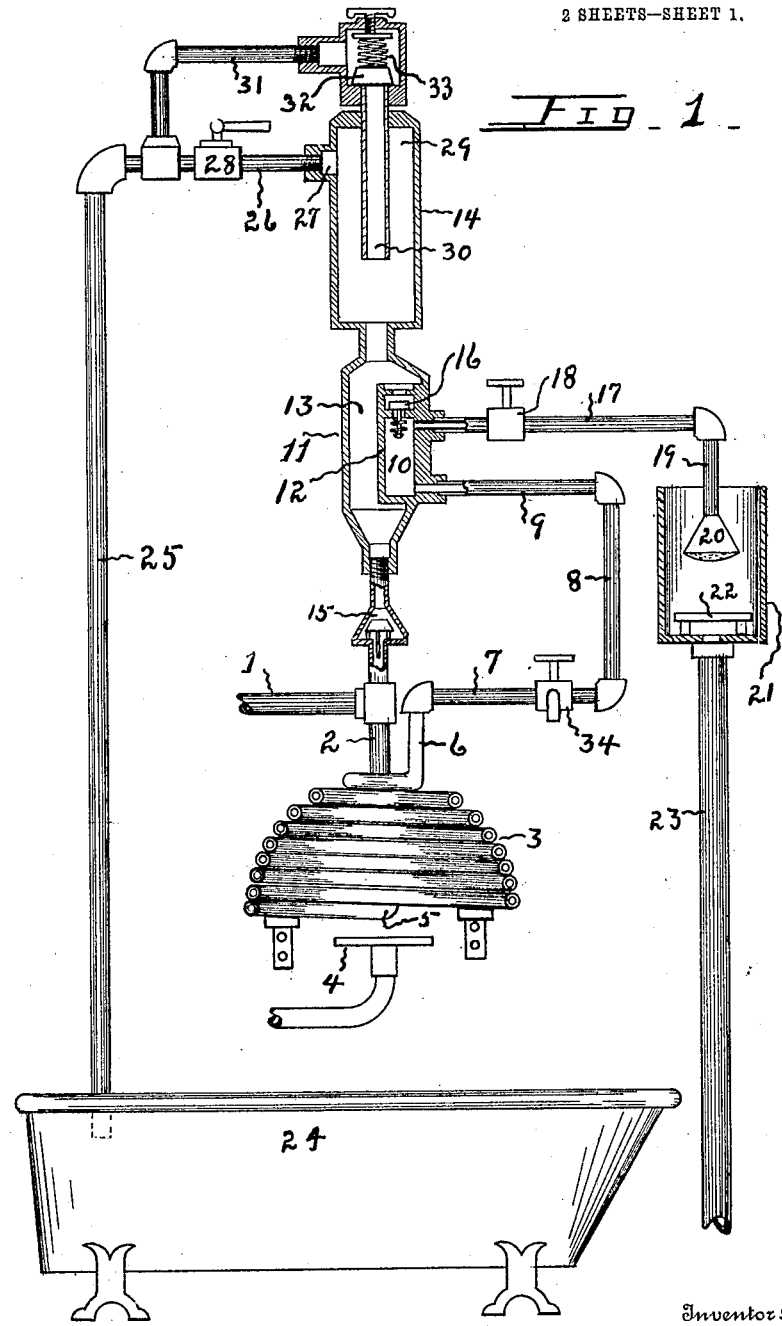

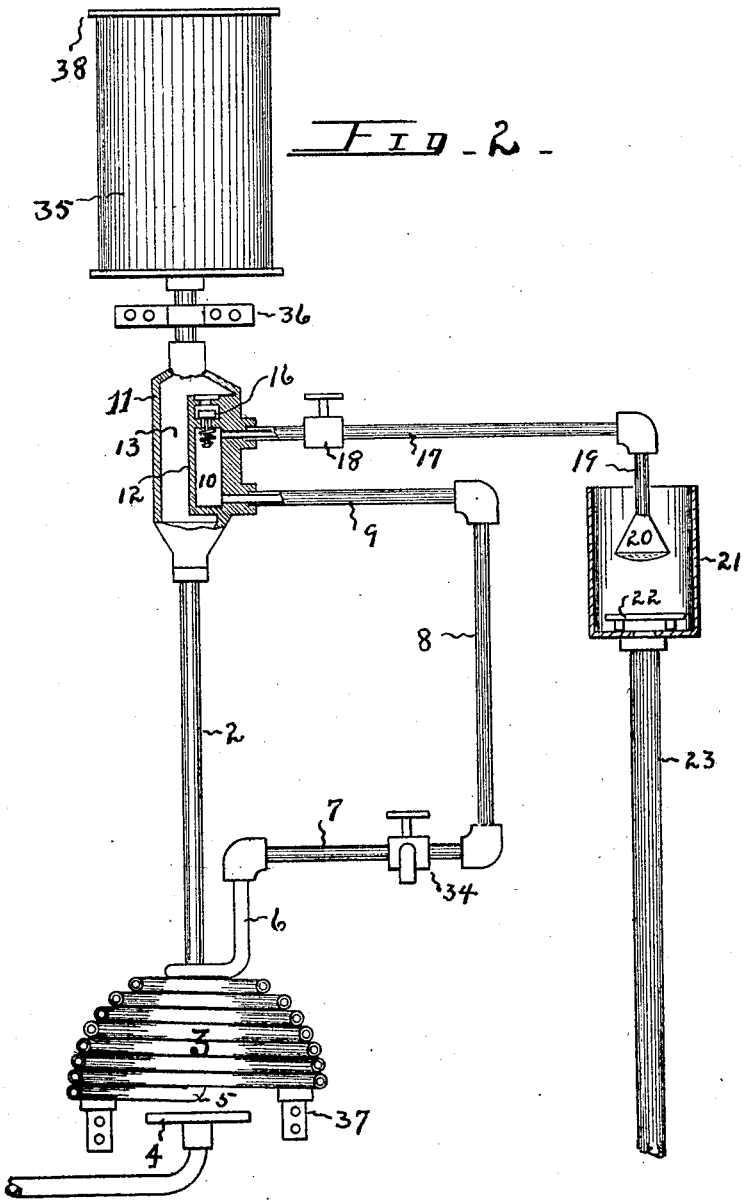

FRANCIS E. LYON AND THOMAS H. HICKOK, OF OMAHA, NEBRASKA.

WATER-HEATING APPARATUS.

No. 913,832.  Specification of Letters Patent.  Patented March 2, 1909.

Application filed November 23, 1908. Serial No. 464,139.

*To all whom it may concern:*

Be it known that we, FRANCIS E. LYON and THOMAS H. HICKOK, citizens of the United States, residing at Omaha, in the county of Douglas and State of Nebraska, have invented certain new and useful Improvements in Water-Heating Apparatus, of which the following is a specification.

This invention relates to improvements in water heating apparatus for use particularly in barber shops and residences.

The object of the invention is the provision of means for heating water more quickly and economically than formerly accomplished, and to provide within a limited space the heating, sterilizing and water-circulating devices.

The invention has reference to the provision of a novel two-way, chambered, connecting-head found convenient for use with other water circulation devices employed, whereby economy in heating the water is attained, and to the arrangement of certain pipes for promoting water circulation.

The invention consists of the novel combination and arrangement of parts as described herein, pointed out by the claims and as illustrated in the drawing, wherein,—

Figure 1 is a vertical, side view of a water heating apparatus embodying our invention, parts thereof being in section for clearly illustrating construction. Fig. 2 is a view somewhat similar to that shown in Fig. 1, to illustrate adaptation of the invention and its uses where water pressure is derived from a wall-tank.

Referring now to the drawing for a more particular description, numeral 1 indicates an intake pipe for receiving water from the city water-main, and is connected with vertical conducting pipe 2. We provide the pipe-coil or heating compartment 3, preferably formed of round, copper, tubing bent spirally to provide coils of different diameters, and seated closely together with the largest coil at the bottom and each succeeding, upper coil of less diameter than the coil below it, the compartment thus provided being a dome-shaped confining-wall composed of water pipes, whereby, within small space a considerable area of pipe surface may be exposed to a burner 4, which may be disposed immediately below compartment 3. While we have shown round tubing for the coils, oval or other shaped tubing could be used, as is obvious, and we do not wish to be understood as limiting ourselves in this respect. At the lower end of pipe 2 and at the base of heating compartment 3 is indicated the intake 5 of said heating compartment, its exit being pipe 6 at its upper end. We provide the lower, horizontal pipe 7, the vertical pipe 8 and upper horizontal pipe 9, all being suitably connected and communicating with pipe 6. Pipe 9 has a connection with chamber 10, formed in head 11. Head 11 is formed as a casing having an inner longitudinal, dividing-wall 12 extending a part of its length to provide the lengthwise-extending channel 13 communicating at its upper end with container or receptacle 14 and with conducting-pipe 2 at its lower end; this last connection being made by passing the intermediate valve 15, said valve 15 being an inverted check-valve. Chamber 10 is in communication with channel 13 by means of check-valve 16. As thus described, water entering pipe 1 may pass downward through pipe 2 to flow through the coils and from thence upward through pipes 6, 7, 8 and 9 to enter chamber 10, and when heated will, on account of increased pressure, pass valve 16 to enter channel 11, and a circulation is thereby provided for heated water whereby it may pass repeatedly upon the same course to be heated and again heated in the coils. We provide the horizontal pipe 17 connecting with chamber 10 and provided with cut-off valve 18, its outer, downwardly-extending terminal 19 being provided with the sprayer 20.

At 21 is indicated a sterilizing tank having a platform-frame therein shown at 22 seated upon the base of the tank, said tank having a waste pipe 23.

The "flowing capacity" of pipe 17 should be less than that of pipe 9, and, in order that there may be a regular flow of water unaccompanied by vibration, pipe 9 should have a capacity, substantially equal to the combined capacity of pipe 17 and valve 16.

At 24 is shown a bath tub, to which water may be conveyed by vertical pipe 25. Communicating at one of its ends with pipe 25, is horizontal connecting-pipe 26, the opposite end of this pipe being connected with and at the upper end of receptacle 14, and providing for exit way 27 of said receptacle; and midway of the ends of the pipe 26 is cut-off valve 28; and in using hot water for bathing purposes, valve 28 may be opened to allow water to pass to hub 24, its passage being through chamber 10, a part of receptacle 14 and pipe 26, and, as is apparent, water will remain in receptacle 14 and will reach the same altitude as exit way 27, and, as mentioned hereinafter, may, under certain conditions pass higher.

The upper portion of receptacle 14, or that part having an altitude above exit way 27, contains air and may be designated as compression-chamber 29. Tube 30 is disposed longitudinally within receptacle 14 with its intake end lower than exit way 27; it traverses the upper end of receptacle 14. An exterior flow pipe 31 is provided to communicate between pipe 26 and tube 30, the connection of pipe 31 with pipe 26 being outwardly of cut off valve 28. Pipe 31 is provided with the adjustable check-valve 32, which operates as a safety valve.

By reason of the form of the coils, the manner of their disposal and means for water circulation, as described, water is very quickly heated, and valve 32 and parts connected therewith will prevent bursting of the pipes from undue pressure or other injurious results from application of heat, when operated by parties not familiar with the heating capacity of the apparatus; and by means of these devices no harm can result from carelessness or neglect in operation or undue pressure in the pipes.

Valve 18 should remain closed at all times except when the sterilizer is in operation. If heating of water is continued by use of burner 4 for a considerable period, cut-off valves 28 and 18 both being closed, air within chamber 29 will be compressed, thereby forcing water upward through tube 30 to overcome the resiliency of spring 33, and will pass valve 32, pipe 31 and pipe 25.

Valve 32 may be adjusted by means of the screw-plug plainly shown in the drawing; it bears upon the upper end of spring 33, and by a partial rotation of this plug, the resiliency of the spring may be increased or diminished, and valve 32 will thereby be adjusted to resist any desired degree of compression of air contained in chamber 29, and if, through inadvertence or otherwise, the contents of the pipes are superheated, an overflow at pipe 31 will occur by reason of the described construction, and the pipes or coils will not be injured.

It is understood that air within chamber 29 will at all times be somewhat compressed by operation of water pressure, valves 28 and 18 being closed, but the adjustment of valve 32, above mentioned, is such that the pressure thus exerted will not cause water to pass overflow pipe 31, and it is only when the normal water pressure and that produced by heat are combined that the safety valve will be forced open.

At 34 is indicated a bib upon pipe 7 for drawing water, and, as described, the apparatus, which may be disposed within a limited space, provides a means for heating water very quickly and at very slight comparative cost, the means operating reliably and automatically for preventing bursting or injury to the pipes.

Fig. 2 illustrates adaptation of the invention for use in localities where water pressure, usually found in cities and large towns, is not available. In such cases water may be contained in wall-tank 35 and may pass channel 13 and thence through pipe 2 to become heated by coils 3, thence passing respectively through pipes 6, 7 8 and 9 to enter chamber 10 of head 11, the parts being supported by wall brackets 36 and 37. As heretofore described, hot water may be employed within sterilizing tank 21, under control of valve 18, and it will be seen that water, under pressure of heat derived from burner 4, will cause water to pass valve 16 and enter channel 13, and the water circulation through the parts, so far as shown by this figure, are the same as already described. Also it will be seen that danger from bursting of pipes from pressure is eliminated, since water when considerably heated may pass upward within, and may overflow tank 35, cover 38 thereon, being removable. The apparatus shown by this figure may be constructed at small expense and is useful for the herein described purposes.

Having fully described the several parts, operation will be understood without further explanation.

While we have described the preferred construction, we do not limit ourselves to exactness of details, unless limited by the appended claims.

What we claim as our invention is,—

1. An apparatus for the purpose described, comprising, in combination with a supply pipe, a heating coil communicating with the supply pipe, a casing having a longitudinal channel in communication with the supply pipe and formed with a chamber in communication with said heating coil; a check valve in said casing under control to normally prevent communication between said chamber and channel; said check valve adapted to be opened by operation of heat from the heating coil to cause a circulation of water from said heating coil to the supply pipe by passing the chamber of said casing.

2. An apparatus for the purpose named, comprising, in combination with water heating means consisting of tubing bent to form coils of different sizes and disposed spirally to form a dome-shaped water heating compartment; a burner for said water heating compartment; a water supply pipe in communication with the water heating compartment; a casing having a channel in communication with the water supply pipe and formed with a chamber in communication with the water heating compartment; a check valve in said casing under control to normally prevent communication between said chamber and channel; said check valve adapted to be opened by operation of the heating compartment to cause a circulation of water from said heating compartment to said water supply pipe by passing the chamber of said casing.

3. An apparatus for the purpose named, comprising, in combination with a supply pipe, a heating coil communicating with the supply pipe, a casing having a channel in communication with the supply pipe and formed with a chamber in communication with said heating coil; an overflow receptacle upon said casing and in communication with said longitudinal channel; a check valve in said casing under control to normally prevent communication between said chamber and channel; said check valve adapted to be opened by operation of heat from the heating coil to cause a circulation of water from said heating coil to the supply pipe and to said overflow receptacle by passing the chamber of said casing.

In testimony whereof we have affixed our signatures in presence of two witnesses.

FRANCIS E. LYON.
THOMAS H. HICKOK.

Witnesses:
 HIRAM A. STURGES,
 ARTHUR STURGES.